United States Patent
Miyakoshi et al.

(10) Patent No.: US 11,180,818 B2
(45) Date of Patent: Nov. 23, 2021

(54) STEEL BAR FOR HOT FORGING

(71) Applicant: Nippon Steel Corporation, Tokyo (JP)

(72) Inventors: Yusuke Miyakoshi, Tokyo (JP); Motoki Takasuga, Tokyo (JP)

(73) Assignee: Nippon Steel Corporation, Tokyo (JP)

( * ) Notice: Subject to any disclaimer, the term of this patent is extended or adjusted under 35 U.S.C. 154(b) by 175 days.

(21) Appl. No.: 16/484,666

(22) PCT Filed: Feb. 23, 2018

(86) PCT No.: PCT/JP2018/006622
§ 371 (c)(1),
(2) Date: Aug. 8, 2019

(87) PCT Pub. No.: WO2018/155610
PCT Pub. Date: Aug. 30, 2018

(65) Prior Publication Data
US 2020/0010916 A1    Jan. 9, 2020

(30) Foreign Application Priority Data
Feb. 24, 2017 (JP) .............. JP2017-033853

(51) Int. Cl.
*C22C 38/42* (2006.01)
*C22C 38/44* (2006.01)
*C22C 38/46* (2006.01)
*C22C 38/50* (2006.01)
*C21D 8/06* (2006.01)
*F16C 7/02* (2006.01)

(52) U.S. Cl.
CPC .............. *C21D 8/06* (2013.01); *C22C 38/42* (2013.01); *C22C 38/44* (2013.01); *C22C 38/46* (2013.01); *C22C 38/50* (2013.01); *F16C 7/023* (2013.01)

(58) Field of Classification Search
CPC ......... C22C 38/42; C22C 38/44; C22C 38/46; C22C 38/50
USPC ........................................... 148/598
See application file for complete search history.

(56) References Cited

FOREIGN PATENT DOCUMENTS

| JP | 2004-277817 A | 10/2004 |
| JP | 2006-336071 A | 12/2006 |
| JP | 2008-208397 A | 9/2008 |

(Continued)

OTHER PUBLICATIONS

Anami et al., JP 2008208397 machine translation, Sep. 11, 2008, entire translation (Year: 2008).*

(Continued)

*Primary Examiner* — Humera N. Sheikh
*Assistant Examiner* — Katherine A Christy
(74) *Attorney, Agent, or Firm* — Banner & Witcoff, Ltd.

(57) ABSTRACT

A steel bar for hot forging according to the present disclosure has a chemical composition consisting of, in mass percent, C: 0.05 to 0.40%, Si: 0.05 to 0.50%, Mn: 1.51 to 3.50%, P: 0.010 to 0.100%, S: 0.30% or less, Cr: 0.05 to 2.50%, V: 0.10 to 0.75%, Ti: 0.005% to 0.250%, Al: 0.005 to 0.060%, and N: 0.002 to 0.020%, with the balance being Fe and impurities, and satisfying Formula (1). A number density of TiNs having a circle equivalent diameter of not less than 20 μm in steel is 0.3 to 4.0/mm$^2$:

$$0.48 \leq C+0.11Mn+0.08Cr+0.75V+0.20Mo \leq 1.50 \quad (1)$$

where, symbols of elements in Formula are to be substituted by contents of corresponding elements (in mass percent).

4 Claims, 2 Drawing Sheets (56) References Cited

FOREIGN PATENT DOCUMENTS

| | | |
|---|---|---|
| JP | 2011-195862 A | 10/2011 |
| JP | 2016-027204 A | 2/2016 |
| WO | 2009107282 A1 | 9/2009 |

OTHER PUBLICATIONS

English Abstract of JP-2004-277817.
English Abstract of JP-2006-336071.
English Abstract of JP-2011-195862.
English Abstract of JP-2016-027204.
English Abstract of WO-2009-107282A1.

* cited by examiner

FIG. 1

PRIOR ART

STEEL BAR FOR HOT FORGING

TECHNICAL FIELD

The present invention relates to a steel bar, more specifically to a steel bar used for a hot-forged product (hereafter, also referred to as a steel bar for hot forging).

BACKGROUND ART

A connecting rod used in an automobile engine and the like (hereafter, also referred to as a conrod) is an engine part for coupling a piston and a crankshaft, and converts reciprocating motion of the piston into rotating motion of the crank.

Figure 1:
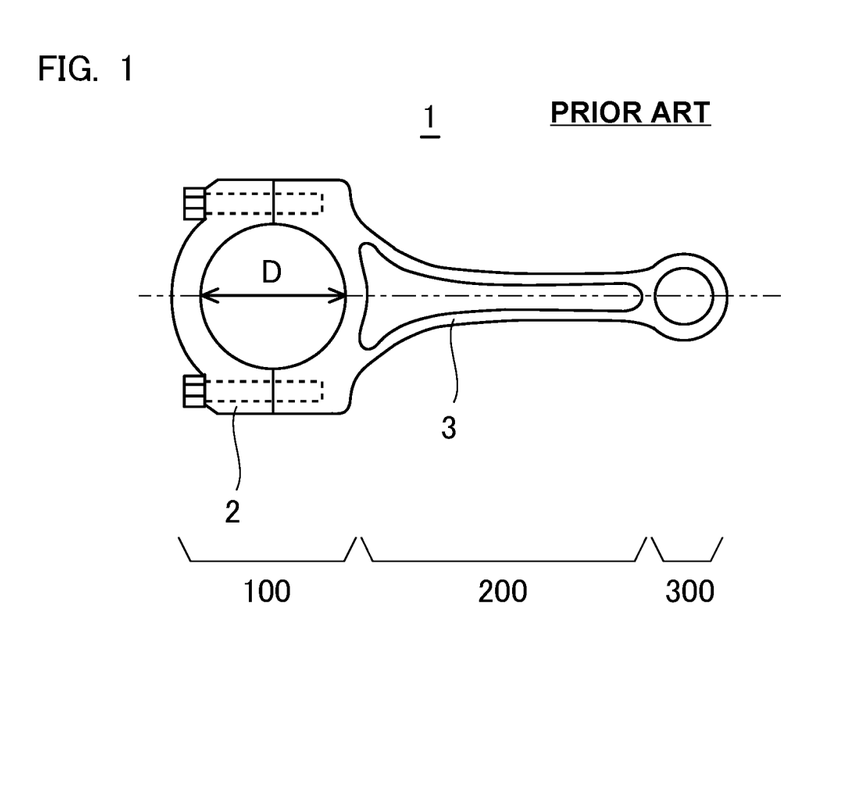
FIG. 1 is a front view of a conventional connecting rod.

FIG. 1 is a front view of a conventional conrod. As illustrated in FIG. 1, the conventional conrod 1 includes a large end portion 100, a rod portion 200, and a small end portion 300. The large end portion 100 is located at one end of the rod portion 200, and the small end portion 300 is located at the other end of the rod portion 200. The large end portion 100 is coupled to a crank pin. The small end portion 300 is coupled to a piston.

The conventional conrod 1 includes two parts: a cap 2 and a rod 3. These parts are normally produced by hot forging. The cap 2 and one end portion of the rod 3 correspond to the large end portion 100. The rest other than the one end portion of the rod 3 corresponds to the rod portion 200 and the small end portion 300. The large end portion 100 and the small end portion 300 are formed by cutting. Therefore, the conrod 1 requires a high machinability.

The conrod 1 is subjected to loads from members around the conrod 1, when an engine runs. In recent years, there is a demand for reduction in size of the conrod 1 and improvement of an in-cylinder pressure of a cylinder for fuel saving. To this end, the conrod 1 is required to have an excellent yield strength that can bear explosive loads from a piston even with a thinner rod portion 200. In addition, the conrod is also required to have an excellent fatigue strength because the conrod is subjected to a compressive load and a tensile load repeatedly.

In recent years, from the view point of energy saving and cost reduction, the adoption of a non-heat treated conrod, for which thermal refining treatment (quenching and tempering) is omitted, has been started. Therefore, there is a demand for a non-heat treated steel that provides a sufficient yield strength, fatigue strength, and machinability without thermal refining treatment after hot forging.

By the way, as described above, for the conventional conrod 1, the cap 2 and the rod 3 are produced separately. Therefore, to position the cap 2 and the rod 3, a dowel pinning process is performed. In addition, a cutting working process is performed on mating surfaces of the cap 2 and the rod 3. Thus, a fracture splitting connecting rod, for which these processes can be omitted, is gaining popularity.

In a case of a fracture splitting connecting rod, the conrod is integrally molded, a jig is then inserted into a hole of a large end portion 100, a stress is applied to break off the large end portion 100, and the large end portion is separated into two parts (corresponding to a cap 2 and a rod 3). Then, when the conrod is attached to a crankshaft, the separated two parts are joined. As long as the fracture surfaces of the large end portion 100 are brittle fracture surfaces, which are free from deformation, the fracture surfaces of the cap 2 and the rod 3 can be fit and connected by a bolt. In this case, therefore, the dowel pinning process and the cutting working process are omitted. The result is that a production cost is reduced.

To produce the fracture splitting connecting rod, the integral molding of the conrod is performed by hot forging in general. In the present specification, a steel bar for hot forging after hot forging is also referred to as a "hot-forged product". Here, in a case where the steel bar is used for the fracture splitting connecting rod, a toughness of the hot-forged product is preferably low. In a case of a steel having a high toughness, when the large end portion is broken off, a ductile fracture surface is likely to occur on its fracture surface. In this case, the large end portion may be plastically deformed. This prevents the fracture surfaces from being snugly fit together, and an inner diameter D of the large end portion 100 of FIG. 1 deviates from a desired value. As a result, uneven contact occurs in a crank coupling portion (large end portion 100), which can cause vibration or noise during traveling of an automobile.

Such steels having high fracture splittabilities are proposed in Japanese Patent Application Publication No. 2004-277817 (Patent Literature 1), Japanese Patent Application Publication No. 2011-195862 (Patent Literature 2), International Application Publication No. WO2009/107282 (Patent Literature 3), Japanese Patent Application Publication No. 2006-336071 (Patent Literature 4), and Japanese Patent Application Publication No. 2016-27204 (Patent Literature 5).

A high-strength non-heat treated steel disclosed in Patent Literature 1 has a composition consisting of, in weight percent, C: 0.2 to 0.6%, Si: 0.1 to 2%, Mn: 0.1 to 1.5%, S: 0.03 to 0.2%, P: 0.02 to 0.15%, Cu: 0.03 to 1%, Ni: 0.03 to 1%, Cr: 0.05 to 1%, V: 0.02 to 0.4%, Ti: 0.01 to 0.8%, s-Al: 0.005 to 0.045%, and N: 0.008 to 0.035%, with the balance being unavoidable impurities and Fe, containing a ferrite-pearlite structure. The maximum diameter of TiN inclusions in the steel is not less than 5 μm, and the number of the TiN inclusions is not less than 5/mm$^2$ in terms of number density. Patent Literature 1 describes that this non-heat treated steel has a high strength and a good machinability, as well as an excellent fracture splittability, and when broken off, the non-heat treated steel can form a preferable unevenness on its fracture surface.

A non-heat treated steel to be hot-forged disclosed in Patent Literature 2 contains, in mass percent, C: 0.35 to 0.55%, Si: 0.15 to 0.40%, Mn: 0.50 to 1.00%, P: 0.100% or less, S: 0.040 to 0.100%, Cr: 1.00% or less, V: 0.20 to 0.50%, Ca: 0.0005 to 0.0100%, and N: 0.0150% or less, with the balance being Fe and unavoidable impurities. In a chemical composition of the steel, 2Mn+5Mo+Cr≤3.1 and C+Si/5+Mn/10+10P+5V≥1.8 are satisfied, and Ceq=C+Si/7+Mn/5+Cr/9+V falls within a range of 0.90 to 1.10. The steel has a hardness of not less than HV330 and a yield ratio of not less than 0.73. A structure of the steel is a ferrite-pearlite structure containing not more than 10% of bainite. Patent Literature 2 describes that this non-heat treated steel to be hot-forged can provide a hot-forged non-heat treated steel part that is allowed to have an excellent machinability and fracture splittability while allowed to have a high strength.

A non-heat treated steel to be hot-forged disclosed in Patent Literature 3 contains, in mass percent, C: more than 0.35% to 0.60%, Si: 0.50 to 2.50%, Mn: 0.20 to 2.00%, P: 0.010 to 0.150%, S: 0.040 to 0.150%, V: 0.10 to 0.50%, Zr: 0.0005 to 0.0050%, Ca: 0.0005 to 0.0050%, N:0.0020 to 0.0200%, and Al: limited to less than 0.010%, with the balance substantially being Fe and unavoidable impurities.

Patent Literature 3 describes that this non-heat treated steel to be hot-forged is excellent in fracture splittability and machinability.

A steel for conrod disclosed in Patent Literature 4 contains, in mass percent, C: 0.1 to 0.5%, Si: 0.1 to 2%, Mn: 0.5 to 2%, P: 0.15% or less (0% exclusive), S: 0.06 to 0.2%, N: 0.02% or less (0% exclusive), Ca: 0.0001 to 0.005%, and Al: 0.001 to 0.02%, with the balance being Fe and unavoidable impurities. Patent Literature 4 describes that a fracture splittability of the steel can be increased because a composition of oxide-based inclusions present in this steel for conrod is controlled within a predetermined range.

A age-hardening bainite non-heat treated steel disclosed in Patent Literature 5 contains, in mass percent, C: 0.10 to 0.40%, Si: 0.01 to 2.00%, Mn: 0.10 to 3.00%, P: 0.001 to 0.150%, S: 0.001 to 0.200%, Cu: 0.001 to 2.00%, Ni: 0.40% or less, and Cr: 0.10 to 3.00% and further contains one or more types of element of Mo: 0.02 to 2.00%, V: 0.02 to 2.00%, Ti: 0.001 to 0.250%, and Nb: 0.01 to 0.10%, with the balance being Fe and unavoidable impurities, and content mass percents of contained predetermined chemical components satisfy $3\times[C]+10\times[Mn]+2\times[Cu]+2\times[Ni]+12\times[Cr]+9\times[Mo]+2\times[V]\geq20$, $32\times[C]+3\times[Si]+3\times[Mn]+2\times[Ni]+3\times[Cr]+11\times[Mo]+32\times[V]+65\times[Ti]+36\times\times[Nb]24$, $321\times[C]-31\times[Mo]+213\times[V]+545\times[Ti]+280\times[Nb]\geq100$, and $321\times[C]-31\times[Mo]+213\times[V]+545\times[Ti]+280\times[Nb]\geq100$. Patent Literature 5 describes that even when a part made of this age-hardening bainite non-heat treated steel is produced by fracture splitting work, plastic deformation occurring during the fracture splitting work can be suitably inhibited.

CITATION LIST

Patent Literature

Patent Literature 1: Japanese Patent Application Publication No. 2004-277817
Patent Literature 2: Japanese Patent Application Publication No. 2011-195862
Patent Literature 3: International Application Publication No. WO2009/107282
Patent Literature 4: Japanese Patent Application Publication No. 2006-336071
Patent Literature 5: Japanese Patent Application Publication No. 2016-27204

SUMMARY OF INVENTION

Technical Problem

As described above, to increase the fracture splittability of the hot-forged product, the toughness of the hot-forged product is preferably low. Therefore, it is assumed in conventional practices that the microstructure of the hot-forged product mainly contains ferrite and pearlite. In recent years, however, there is a demand for a steel bar for hot forging that makes a microstructure of a hot-forged product mainly contain bainite, for the purpose of obtaining a high fatigue strength.

However, bainite has a high toughness. Therefore, in a case where a microstructure of a hot-forged product is made to mainly contain bainite, a ductile fracture surface is likely to develop on a fracture surface of the hot-forged product after cracking. As a result, a fracture splittability after hot forging decreases. Therefore, a high fracture splittability is demanded of a steel bar for hot forging even when the microstructure of its hot-forged steel mainly contains bainite.

In Patent Literatures 1, 3, and 4, it is assumed that the microstructure of the hot-forged product mainly contains ferrite and pearlite. Thus, when the microstructure of the hot-forged product is made mainly contain bainite, a ductile fracture surface may occur on a fracture surface of the hot-forged product, which causes an inner diameter of a large end portion of the hot-forged product to be deformed, resulting in a decrease in a fracture splittability of the hot-forged product.

In Patent Literature 2, bainite produced in the hot-forged product is allowed to some extent. However, in a case where an area fraction of bainite occupying a microstructure increases, a ductile fracture surface may occur on a fracture surface, resulting in a decrease in the fracture splittability.

Patent Literature 5 describes that a Charpy impact value (2 mmU) can be set at not more than 30 J/cm$^2$ even when a microstructure mainly contains bainite. However, the technique falls short of inhibiting ductile breakage sufficiently to reduce a deformation amount of a conrod after cracking, which causes an inner diameter of a large end portion to be deformed, resulting in a decrease in the fracture splittability.

An objective of the present disclosure is to provide a steel bar for hot forging having an excellent hot workability, having a high yield strength, a high fatigue strength, and a high machinability after hot forging, and having an excellent fracture splittability even when its microstructure after hot forging mainly contain bainite.

Solution to Problem

A steel bar for hot forging according to the present disclosure has a chemical composition consisting of, in mass percent, C: 0.05 to 0.40%, Si: 0.05 to 0.50%, Mn: 1.51 to 3.50%, P: 0.010 to 0.100%, S: 0.30% or less, Cr: 0.05 to 2.50%, V: 0.10 to 0.75%, Ti: 0.005% to 0.250%, Al: 0.005 to 0.060%, N: 0.002 to 0.020%, Cu: 0 to 0.60%, Ni: 0 to 0.60%, Mo: 0 to 0.70%, Nb: 0 to 0.100%, Pb: 0 to 0.30%, Te: 0 to 0.3000%, Ca: 0 to 0.0100%, and Bi: 0 to 0.4000%, with the balance being Fe and impurities, and satisfying Formula (1). In the steel bar for hot forging according to the present disclosure, a number density of TiNs having a circle equivalent diameter of not less than 20 μm in steel is 0.3 to 4.0/mm$^2$:

$$0.48\leq C+0.11Mn+0.08Cr+0.75V+0.20Mo\leq1.50 \quad (1)$$

where, symbols of elements in Formula (1) are to be substituted by contents of corresponding elements (in mass percent).

Advantageous Effects of Invention

The steel bar for hot forging according to the present disclosure has an excellent hot workability, has a high yield strength, a high fatigue strength, and a high machinability after hot forging, and has an excellent fracture splittability even when its microstructure after the hot forging mainly contains bainite.

DESCRIPTION OF EMBODIMENTS

An embodiment of the present invention will be described below in detail.

The present inventors conducted investigations and studies on a hot workability of a steel bar for hot forging, and a yield strength, a fatigue strength, a machinability, and a fracture splittability of a steel bar for hot forging after hot forging (hot-forged product). Consequently, the present inventors obtained the following findings.

(A) Yield Strength and Machinability

The yield strength is mutually contradictory mechanical property to the machinability. However, if a chemical composition can be adjusted properly, the compatibility between these mechanical properties can be established.

Define fn1 as fn1=C+0.11Mn+0.08Cr+0.75V+0.20Mo. The above fn1 is an index of the strength and shows a positive correlation with the yield strength. In a steel bar for hot forging having a chemical composition consisting of, in mass percent, C: 0.05 to 0.40%, Si: 0.05 to 0.50%, Mn: 1.51 to 3.50%, P: 0.010 to 0.100%, S: 0.30% or less, Cr: 0.05 to 2.50%, V: 0.10 to 0.75%, Ti: 0.005% to 0.250%, Al: 0.005 to 0.060%, N: 0.002 to 0.020%, Cu: 0 to 0.60%, Ni: 0 to 0.60%, Mo: 0 to 0.70%, Nb: 0 to 0.100%, Pb: 0 to 0.30%, Te: 0 to 0.3000%, Ca: 0 to 0.0100%, and Bi: 0 to 0.4000%, with the balance being Fe and impurities, when fn1 is less than 0.48, a strength of the steel becomes excessively low, failing to obtain a sufficient yield strength. In contrast, when fn1 is greater than 1.50, the strength of the steel becomes excessively high, resulting in a decrease in machinability of the steel. In the steel bar for hot forging having the above chemical composition, when fn1 falls within a range of 0.48 to 1.50, a hot-forged product has an excellent yield strength and an excellent machinability.

(B) Fracture Splittability

In the present specification, the phrase "having a high fracture splittability" means that a fracture surface of a hot-forged product resists developing a ductile fracture surface. As described above, to increase a fracture splittability of a hot-forged product, a toughness of the hot-forged product is preferably made low. Here, a hot-forged product to be used as a fracture splitting connecting rod normally has an absorbed energy E (2 mmV) in the Charpy impact test defined in JIS Z 2242(2005) of less than about 20 J/cm². In addition, the hot-forged product has a fracture toughness value $K_Q$ defined in ASTM E399-06 of less than about 40 MPa√m.

For the purpose of obtaining such a hot-forged product having a high fracture splittability, the present inventors further conducted investigations and studies on how to improve a fracture splittability of a hot-forged product containing a microstructure that mainly containing bainite. As a result, the present inventors have found that an excellent fracture splittability can be obtained even for a hot-forged product containing a microstructure that mainly contain bainite, by bringing a number density of coarse TiNs in steel within a proper range.

Specifically, in a solidification process of molten steel in continuous casting, Ti forms Ti nitride (TiN), Ti sulfide, and Ti carbo-sulfide. Of these, TiN is not dissolved but remains even in a heating process before the hot forging. Therefore, such TiN also remains in the hot-forged product. The remaining TiNs serve as starting points of fracture at a plurality of locations in cracking the hot-forged product. That is, in the cracking, sharp initial cracks are formed in boundaries between TiNs and a parent phase (matrix). In each of the sharp initial cracks, a strong plastic constraint is imposed on its tip. This is likely to cause brittle fracture. An initial crack propagates in a brittle manner into a crack and connects with an adjacent crack occurring from another TiN, which results in a brittle fracture surface. Therefore, even in a case of a steel material containing a microstructure that mainly contains bainite and therefore having a high toughness, a fracture surface can be made into the form of a brittle fracture surface if a brittle crack propagation can be caused by using a proper number of TiNs having a proper size, so that a ductile fracture surface is inhibited. It is considered that an excellent fracture splittability can be obtained as a result.

Thus, to obtain the above effect, the present inventors further conducted studies on the proper number of TiNs having the proper size. As a result, the following findings were obtained. When the number density of TiNs not less than 20 μm in terms of circle equivalent diameter (hereafter, also referred to as coarse TiNs) is less than 0.3/mm², a sufficient fracture splittability cannot be obtained. In contrast, when the number density of the coarse TiN is more than 4.0/mm², an excellent fracture splittability can be obtained, whereas the hot workability deteriorates. It is therefore found that, in the steel bar for hot forging having the above chemical composition and satisfying Formula (1), when a number density of coarse TiNs in the steel is 0.3 to 4.0/mm², an excellent fracture splittability can be obtained while a hot workability, a yield strength, a fatigue strength, and a machinability after hot forging are kept, even when its microstructure mainly contains bainite.

The steel bar for hot forging according to the present embodiment that is made based on the above findings has a chemical composition consisting of, in mass percent, C: 0.05 to 0.40%, Si: 0.05 to 0.50%, Mn: 1.51 to 3.50%, P: 0.010 to 0.100%, S: 0.30% or less, Cr: 0.05 to 2.50%, V: 0.10 to 0.75%, Ti: 0.005% to 0.250%, Al: 0.005 to 0.060%, N: 0.002 to 0.020%, Cu: 0 to 0.60%, Ni: 0 to 0.60%, Mo: 0 to 0.70%, Nb: 0 to 0.100%, Pb: 0 to 0.30%, Te: 0 to 0.3000%, Ca: 0 to 0.0100%, and Bi: 0 to 0.4000%, with the balance being Fe and impurities, and satisfying Formula (1). A number density of TiNs having a circle equivalent diameter of not less than 20 μm in steel is 0.3 to 4.0 /mm²:

$$0.48 \leq C+0.11Mn+0.08Cr+0.75V+0.20Mo \leq 1.50 \quad (1)$$

where, symbols of elements in Formula (1) are to be substituted by contents of corresponding elements (in mass percent).

The chemical composition of the above steel bar for hot forging may contain one or more types of element selected from the group consisting of Cu: 0.01 to 0.60%, Ni: 0.01 to 0.60%, Mo: 0.01 to 0.70%, and Nb: 0.005 to 0.100%.

The chemical composition of the above steel bar for hot forging may contain one or more types of element selected from the group consisting of Pb: 0.01 to 0.30%, Te: 0.0003 to 0.3000%, Ca: 0.0003 to 0.0100%, and Bi: 0.0003 to 0.4000%.

The steel bar for hot forging according to the present embodiment is described below in detail. The sign "%" following each element means mass percent unless otherwise noted.

[Chemical Composition]

The chemical composition of the steel bar for hot forging according to the present embodiment contains the following elements.

C: 0.05 to 0.40%

Carbon (C) increases the yield strength and the fatigue strength of steel. An excessively low content of C results in failure to provide this effect. In contrast, an excessively high content of C results in a decrease in machinability. Consequently, the content of C is 0.05 to 0.40%. A lower limit of the content of C is preferably 0.10%, more preferably 0.20%, still more preferably 0.21%. An upper limit of the content of C is preferably 0.39%, more preferably 0.38%, still more preferably 0.37%.

Si: 0.05 to 0.50%

Silicon (Si) is dissolved in steel, increasing the fatigue strength of the steel. An excessively low content of Si results in failure to provide the effect. In contrast, an excessively high content of Si makes the above effects saturated. An excessively high content of Si further results in a decrease in the hot workability of steel, increasing a production cost of the steel bar. Consequently, the content of Si is 0.05 to 0.50%. A lower limit of the content of Si is preferably 0.06%, more preferably 0.07%, still more preferably 0.08%. An upper limit of the content of Si is preferably 0.49%, more preferably 0.48%, still more preferably 0.47%.

Mn: 1.51 to 3.50%

Manganese (Mn) deoxidizes steel. In addition, Mn increases the yield strength and the fatigue strength of steel. An excessively low content of Mn results in failure to provide these effects. In contrast, an excessively high content of Mn results in a decrease in the hot workability of steel. Consequently, the content of Mn is 1.51 to 3.50%. A lower limit of the content of Mn is preferably 1.52%, more preferably 1.53%, still more preferably 1.55%. An upper limit of the content of Mn is preferably 3.49%, more preferably 3.48%, still more preferably 3.45%.

P: 0.010 to 0.100%

Phosphorus (P) segregates in grain boundaries, embrittling steel. Therefore, when a fracture splitting connecting rod is broken off to be separated, fracture surfaces of the fracture splitting connecting rod becomes brittle. As a result, in the fracture splitting connecting rod after broken off to be separated, a large end inner diameter deformation amount becomes small. That is, a fracture splittability of the steel after hot forging is increased. An excessively low content of P results in failure to provide this effect. In contrast, an excessively high content of P results in a decrease in the hot workability of steel. Consequently, the content of P is 0.010 to 0.100%. A lower limit of the content of P is preferably 0.011%, more preferably 0.015%, still more preferably 0.020%. An upper limit of the content of P is preferably 0.090%, more preferably 0.080%, still more preferably 0.070%.

S: 0.30% or less

Sulfur (S) is impurities. That is, a content of S is more than 0%. S decreases a hot workability of the steel. Consequently, the content of S is 0.30% or less. An upper limit of the content of S is preferably 0.20%, more preferably 0.15%. The content of S is preferably made as low as possible. However, an excessive decrease in S increases refining costs excessively. Therefore, when taking industrial production into consideration, a lower limit of the content of S is preferably 0.0001%, more preferably 0.0005%.

Cr: 0.05 to 2.50%

Chromium (Cr) increases the yield strength and the fatigue strength of steel. An excessively low content of Cr results in failure to provide this effect. In contrast, an excessively high content of Cr makes the steel excessively hard, decreasing a machinability of the steel. An excessively high content of Cr results in an increase in a production cost. Consequently, the content of Cr is 0.05 to 2.50%. A lower limit of the content of Cr is preferably 0.10%, more preferably 0.12%, still more preferably 0.15%. An upper limit of the content of Cr is preferably 2.00%, more preferably 1.80%, still more preferably 1.60%.

V: 0.10 to 0.75%

Vanadium (V) precipitates in a form of its carbide in ferrite during a cooling process after hot forging, increasing the yield strength and the fatigue strength of the steel after hot forging. An excessively low content of V results in failure to provide the effect. In contrast, an excessively high content of V results in an extremely high production cost of the steel. In addition, an excessively high content of V results in a decrease in machinability. Consequently, the content of V is 0.10 to 0.75%. A lower limit of the content of V is preferably 0.11%, more preferably 0.12%, still more preferably 0.15%. An upper limit of the content of V is preferably 0.70%, more preferably 0.68%, still more preferably 0.66%.

Ti: 0.005 to 0.250%

Titanium (Ti) forms TiN during a solidification process in continuous casting, increasing fracture splittability of the steel after hot forging. More specifically, during the solidification process of molten steel in continuous casting, Ti produces TiN, Ti sulfide, and Ti carbo-sulfide. TiN produced at that time resists dissolving even during a heating step before the hot forging performed thereafter, increasing fracture splittability by satisfying a size and a number density that are described later.

In addition, together with V, Ti precipitates in the form of its carbide during the cooling and heating processes after the hot forging, increasing the fatigue strength of steel. More specifically, when heating the steel bar for hot forging before the hot forging, part of Ti in the Ti sulfide and the Ti carbo-sulfide in the steel is dissolved. After hot forging, when the steel bar is allowed to be cooled to a normal temperature and then reheated, the dissolved Ti precipitates in the form of its carbide together with V increasing the fatigue strength of the steel.

An excessively low content of Ti results in failure to provide these effects. In contrast, an excessively high content of Ti causes coarse TiNs to be produced excessively, resulting in a decrease in hot workability. Consequently, the content of Ti is 0.005% to 0.250%. A lower limit of the content of Ti is preferably 0.010%, more preferably 0.011%, still more preferably 0.020%, still more preferably 0.10%, and still more preferably 0.15%. An upper limit of the content of Ti is 0.240%, more preferably 0.220%.

Al: 0.005 to 0.060%

Aluminum (Al) deoxidizes steel. Al therefore inhibits crystallization of Ti oxides, helping TiN crystallize. As a result, the fracture splittability of the steel is increased. An excessively low content of Al results in failure to provide this effect. In contrast, an excessively high content of Al makes the above effects saturated. An excessively high content of Al further results in a decrease in the hot workability of steel, increasing a production cost of the steel. Consequently, the content of Al is 0.005 to 0.060%. A lower limit of the content of Al is preferably 0.020%. An upper limit of the content of Al is preferably 0.040%. In the steel bar for hot forging according to the present embodiment, the content of Al means acid-soluble Al (what is called "sol.Al").

N: 0.002 to 0.020%

Nitrogen (N) combines with Ti to form TiN, increasing the fracture splittability. An excessively low content of N results in failure to provide this effect. In contrast, an excessively high content of N results in a decrease in the hot workability. Consequently, the content of N is 0.002 to 0.020%. A lower limit of the content of N is preferably 0.003%, more preferably 0.004%, still more preferably 0.005%, still more preferably 0.0051%. An upper limit of the content of N is preferably 0.019%, more preferably 0.018%, still more preferably 0.017%.

The balance of the chemical composition of the steel bar for hot forging according to the present embodiment is Fe and impurities. Here, the impurities mean elements that are mixed from ores and scraps used as raw material, a producing environment, or the like when the steel bar for hot forging is produced in an industrial manner, and are allowed to be mixed within ranges in which the impurities have no adverse effect on the steel bar for hot forging according to the present embodiment.

[Optional Elements]

The steel bar for hot forging according to the present embodiment may further contain, in lieu of a part of Fe, one or more types of element selected from the group consisting of Cu, Ni, Mo, and Nb. All of these elements increase the strength of steel.

Cu: 0 to 0.60%

Copper (Cu) is an optional element and need not be contained. That is, a content of Cu may be 0%. When Cu is contained, Cu is dissolved in the steel, increasing a fatigue strength of the steel. Even a trace amount of Cu can provide the above effect to some extent. However, an excessively high content of Cu results not only in a high production cost of the steel but also in a decrease in machinability. Consequently, the content of Cu is 0 to 0.60%. A lower limit of the content of Cu is preferably 0.01%, more preferably 0.05%, still more preferably 0.10%. An upper limit of the content of Cu is preferably 0.59%, more preferably 0.55%, still more preferably 0.50%.

Ni: 0 to 0.60%

Nickel (Ni) is an optional element and need not be contained. That is, a content of Ni may be 0%. When Ni is contained, Ni is dissolved in the steel, increasing the fatigue strength of the steel. Even a trace amount of Ni can provide the above effect to some extent. However, an excessively high content of Ni results in an increase in production costs. In addition, an excessively high content of Ni excessively increases a toughness of the steel. As a result, a ductile fracture surface is developed on a fracture surface after fracture splitting, decreasing the fracture splittability. Consequently, the content of Ni is 0 to 0.60%. A lower limit of the content of Ni is preferably 0.01%, more preferably 0.02%, still more preferably 0.05%. An upper limit of the content of Ni is preferably 0.59%, more preferably 0.58%, still more preferably 0.55%.

Mo: 0 to 0.70%

Molybdenum (Mo) is an optional element and need not be contained. That is, a content of Mo may be 0%. When Mo is contained, Mo forms its carbide in the steel, increasing a yield strength and a fatigue strength of the steel. Even a trace amount of Mo can provide the above effect to some extent. However, an excessively high content of Mo leads to an excessive increase in hardness of the steel, resulting in a decrease in machinability. In addition, an excessively high content of Mo results in an increase in production costs. Consequently, the content of Mo is 0 to 0.70%. A lower limit of the content of Mo is preferably 0.01%, more preferably 0.02%, still more preferably 0.05%. An upper limit of the content of Mo is preferably 0.69%, more preferably 0.68%, still more preferably 0.65%.

Nb: 0 to 0.100%

Niobium (Nb) is an optional element and need not be contained. That is, a content of Nb may be 0%. When Nb is contained, Nb forms its carbide in the steel, increasing a fatigue strength of the steel. Even a trace amount of Nb can provide the above effect to some extent. However, an excessively high content of Nb leads to an excessive increase in hardness of the steel, resulting in a decrease in machinability. In addition, an excessively high content of Nb causes grains to be refined, excessively increasing the toughness of the steel. As a result, a ductile fracture surface is developed on a fracture surface after fracture splitting, decreasing fracture splittability. Consequently, the content of Nb is 0 to 0.100%. A lower limit of the content of Nb is preferably 0.005%, more preferably 0.010%, still more preferably 0.015%. An upper limit of the content of Nb is preferably 0.095%, more preferably 0.090%, still more preferably 0.085%.

The steel bar for hot forging according to the present embodiment may further contain, in lieu of a part of Fe, one or more types of element selected from the group consisting of Pb, Te, Ca, and Bi. All of these elements increase the machinability of the steel.

Pb: 0 to 0.30%

Lead (Pb) is an optional element and need not be contained. That is, a content of Pb may be 0%. When Pb is contained, Pb increases the machinability of the steel. Even a trace amount of Pb can provide the above effect to some extent. However, an excessively high content of Pb results in a decrease in the hot workability of the steel. Consequently, the content of Pb is 0 to 0.30%. A lower limit of the content of Pb is preferably 0.01%, more preferably 0.05%, still more preferably 0.10%. An upper limit of the content of Pb is preferably 0.29%, more preferably 0.25%, still more preferably 0.20%.

Te: 0 to 0.3000%

Tellurium (Te) is an optional element and need not be contained. That is, a content of Te may be 0%. When Te is contained, Te increases the machinability of the steel. Even a trace amount of Te can provide the above effect to some extent. However, an excessively high content of Te results in a decrease in the hot workability of the steel. Consequently, the content of Te is 0 to 0.3000%. A lower limit of the content of Te is preferably 0.0003%, more preferably 0.0005%, still more preferably 0.0010%. An upper limit of the content of Te is preferably 0.2900%, more preferably 0.2500%, still more preferably 0.2000%.

Ca: 0 to 0.0100%

Calcium (Ca) is an optional element and thus need not be contained. That is, a content of Ca may be 0%. When Ca is contained, Ca increases the machinability of the steel. Even a trace amount of Ca can provide the above effect to some extent. However, an excessively high content of Ca results in a decrease in the hot workability of the steel. Consequently, the content of Ca is 0 to 0.0100%. A lower limit of the content of Ca is preferably 0.0003%, more preferably 0.0005%, still more preferably 0.0010%. An upper limit of the content of Ca is preferably 0.0090%, more preferably 0.0080%, still more preferably 0.0050%.

Bi: 0 to 0.4000%

Bismuth (Bi) is an optional element and need not be contained. That is, a content of Bi may be 0%. When Bi is contained, Bi increases the machinability of the steel. Even a trace amount of Bi can provide the above effect to some extent. However, an excessively high content of Bi results in a decrease in the hot workability of the steel. Consequently, the content of Bi is 0 to 0.4000%. A lower limit of the content of Bi is preferably 0.0003%, more preferably 0.0005%, still more preferably 0.0010%. An upper limit of the content of Bi is preferably 0.3900%, more preferably 0.3000%, still more preferably 0.2000%.

[Formula (1)]

The chemical composition of the steel bar for hot forging according to the present embodiment further satisfies Formula (1):

$$0.48 \leq C+0.11Mn+0.08Cr+0.75V+0.20Mo \leq 1.50 \quad (1)$$

where, symbols of elements in Formula (1) are to be substituted by contents of corresponding elements (in mass percent).

The above fn1 (=C+0.11Mn+0.08Cr+0.75V+0.20Mo) is an index of the strength and shows a positive correlation with the yield strength. When fn1 is less than 0.48, the strength of the steel after the hot forging (hot-forged product) is excessively low, failing to obtain a sufficient yield strength. In contrast, when fn1 is greater than 1.50, the strength of the steel after hot forging (hot-forged product) becomes excessively high, resulting in a decrease in a machinability of the steel after hot forging. Consequently, fn1 is 0.48 to 1.50. A lower limit of fn1 is preferably 0.49, more preferably 0.50, still more preferably 0.51. An upper limit of fn1 is preferably 1.49, more preferably 1.48, still more preferably 1.47.

[Number Density of Coarse TiNs]

In the steel bar for hot forging according to the present embodiment, the number density of TiNs having a circle equivalent diameter of a 20 μm or larger (coarse TiNs) is 0.3 to 4.0/mm². TiNs mean inclusions in which the total content of Ti and N accounts for 80% or more in mass percent.

The steel bar for hot forging according to the present embodiment is subjected to the hot forging to produce a hot-forged product. The hot-forged product is, for example, a fracture splitting connecting rod. The microstructure of the hot-forged product according to the present embodiment (fracture splitting connecting rod) mainly contains bainite. More specifically, not less than 80% of the microstructure in volume ratio is made up of bainite. Bainite has a high toughness as compared with ferrite and perlite. For that reason, when the large end portion of a fracture splitting connecting rod is broken off to produce two parts (a cap and a rod), broken portions suffer plastic deformation, which brings about ductile fracture surfaces on broken surfaces. That is, the fracture splittability decreases.

Even if the microstructure mainly contains bainite, the steel bar for hot forging according to the present embodiment keeps an excellent fracture splittability by bringing the number density of the above coarse TiNs within a proper range. When the number density of the coarse TiNs is less than 0.3/mm², a sufficient fracture splittability cannot be obtained for a hot-forged product having the above chemical composition, the chemical composition satisfying Formula (1). In contrast, when the number density of the coarse TiNs is more than 4.0/mm², a sufficient fracture splittability can be obtained for a hot-forged product having the above chemical composition, the chemical composition satisfying Formula (1), whereas the hot workability of the steel bar for hot forging that serves as a starting material of the above hot-forged product. Consequently, the number density of coarse TiNs is 0.3 to 4.0/mm².

A lower limit of the number density of the coarse TiNs to further increase the fracture splittability is preferably 0.4/mm², more preferably 0.5/mm². An upper limit of the number density of the coarse TiNs to further increase the hot workability is preferably 3.9/mm², more preferably 3.8/mm².

The number density of the coarse TiNs can be measured by the following method. A sample is taken from an R/2 portion of the steel bar. In a surface of the sample, a surface equivalent to a cross section including an axis direction of the steel bar (longitudinal cross-section) is determined as an observation surface. Not being etched, the observation surface is observed under an optical microscope with 200× magnification as it is, and photographic images are created in arbitrary 100 visual fields. The total area of the 100 visual fields is about 11.9 mm². An electron probe micro analyzer (EPMA) is used to analyze the total content of Ti and N in each of inclusions and precipitations in each of the visual fields, so as to determine TiN in each visual field. Using the photographic images of each visual field, the areas of the determined TiN are calculated, and the circle equivalent diameter is calculated from the obtained area. TiNs having circle equivalent diameters of not less than 20 μm are determined as coarse TiNs, and the total number of the coarse TiN is calculated. The value obtained by dividing the total number of the obtained coarse TiNs by the total area of the 100 visual fields is defined as the number density (/mm²) of the coarse TiNs.

[Producing Method]

Description will be made about an example of a producing method for the above steel bar for hot forging. The producing method according to the present embodiment contains a casting step and a hot working step.

[Casting Step]

A molten steel satisfying the above chemical composition and Formula (1) is produced by a known method. For example, using the molten steel, a cast piece (slab or bloom) is produced by the continuous casting process.

To bring the number density of coarse TiNs within the above range, for example, continuous casting can be performed in the casting step in such a manner as to satisfy the following conditions.

Degree of superheating ΔT: 30 to 50° C.

The difference between the temperature of the molten steel in a tundish located on the continuous casting machine, and a TLL (liquidus temperature) is defined as a degree of superheating ΔT (° C.). When ΔT is excessively low, the amount of crystallized TiNs becomes insufficient in some cases. In contrast, when ΔT is excessively high, coarse TiNs precipitate excessively in some cases. Consequently, the degree of superheating ΔT according to the present embodiment is 30 to 50° C. A lower limit of the degree of superheating ΔT is preferably 31° C.

Cross section of cast piece: not less than 300 mm in side length

Casting speed Vc: 0.2 to 0.8 m/min

An excessively high cooling rate in a solidification process for the cast piece results in insufficient crystallization and agglomeration of TiNs in some cases. In this case, circle equivalent diameters of TiNs become small. In contrast, an excessively low cooling rate causes an excessive agglomeration of TiNs, which results in an excessively large number density of coarse TiNs in some cases. Therefore, when a side of a cross section (rectangle) of the cast piece is not less than 300 mm, and the casting speed Vc is 0.2 to 0.8 m/min, TiNs are crystallized sufficiently, and the crystallized TiNs are agglomerated easily. As a result, the number density of coarse TiNs becomes not less than 0.3/mm². An upper limit of the casting speed Vc is preferably 0.6 m/min.

A specific water volume is not limited in particular, and a known specific water volume may be employed. The specific water volume is preferably low as long as the cast piece does not bulge. The specific water volume is preferably, for example, not more than 5 L/kg. Through the above casting step, a cast piece that satisfies the above chemical composition, Formula (1), and the number density of coarse TiNs for the steel bar for hot forging can be obtained.

[Hot Working Step]

In the hot working step, the cast piece produced in the above casting step is subjected to hot working to produce a steel bar for hot forging. The hot working step contains, for example, a rough rolling step and a finish rolling step.

[Rough Rolling Step]

A cast piece or an ingot is subjected to hot rolling to produce a billet. The hot rolling is performed using, for example, a blooming mill and a continuous mill. The continuous mill includes, for example, a plurality of stands arranged in a row, the plurality of stands each including a plurality of rolls

[Finish Rolling Step]

Using the billet, the steel bar for hot forging is produced. In a finish rolling step, first, the billet is heated in a reheating furnace (heating step). After heated, the billet is subjected to the hot rolling (finish rolling) using the continuous mill to produce the steel bar for hot forging (hot rolling step). The steps will be each described below.

[Heating Step]

In the heating step, the billet is heated at a well-known heating temperature. The billet is preferably heated at a heating temperature of 1000 to 1300° C. for not less than 30 minutes. An excessively low heating temperature makes it difficult to agglomerate TiNs in the billet. Fine TiNs present in the billet are therefore not agglomerated but remains after the hot rolling, with the result that many fine Ti nitrides are present in the steel bar. In this case, coarse TiNs in the steel are small in number. In contrast, an excessively high heating temperature causes Ti nitrides to be agglomerated to excess in the heating. With the above casting conditions satisfied, when the heating temperature in the finish rolling is 1000 to 1300° C., the number density of coarse TiNs stably falls within the proper range (0.3 to 4.0/mm$^2$).

[Hot Rolling Step]

The heated billet is subjected to finish rolling (hot rolling) by a known method to produce the steel bar for hot forging, by using a finish rolling mill. The finish rolling mill includes a plurality of stands arranged in a row, the plurality of stands each including a plurality of rolls (a roll group) located around a path line. The roll group of each stand forms a groove, and passing the groove, the billet is rolled to produce the steel bar.

The reduction of area of the continuous mill is preferably 70% or more. Here, the reduction of area is defined by the following formula.

Reduction of area=(Cross-sectional area of billet before finish rolling−Cross-sectional area of steel bar for hot forging after finish rolling)/Cross-sectional area of billet before finish rolling Through the above producing process, the above steel bar for hot forging is produced.

[Producing Method for Hot-Forged Product]

As an example of a producing method for a hot-forged product using the above steel bar for hot forging, a producing method for a fracture splitting connecting rod will be described.

First, a steel bar for hot forging is heated in a high-frequency induction heating furnace. In this case, the temperature for the heating is preferably 1000 to 1300° C., and the duration of the heating is preferably 10 to 15 minutes. Since the duration of the heating is short, the forms of Ti nitrides in the steel bar do not change in particular. The heated steel bar is subjected to hot forging to produce the fracture splitting connecting rod. The reduction rate for the hot forging is preferably not less than 0.22. Here, the reduction rate is determined to be the maximum value of a logarithmic strain occurring in the forging step in portions other than burrs.

The fracture splitting connecting rod subjected to the hot forging is cooled to a normal temperature. Specifically, the fracture splitting connecting rod subjected to the hot forging is allowed to be cooled to a normal temperature. A large end portion of the fracture splitting connecting rod has a small cross-sectional area. Therefore, when the fracture splitting connecting rod is allowed to be cooled to a normal temperature, the microstructure of the fracture splitting connecting rod after the allowing cooling can be made to mainly contain bainite.

To further increase the fatigue strength of the hot-forged product, an area fraction of bainite in the microstructure of the fracture splitting connecting rod can be further increased. As an example, when the fracture splitting connecting rod after the hot forging is cooled to a normal temperature at 1 to 5° C./sec, the area fraction of the bainite in the microstructure of the fracture splitting connecting rod can be further increased. As a result, the fatigue strength of the hot-forged product is further increased.

Note that in the case of the cooling to a normal temperature after the hot forging, TiNs do not experience particular transformation in their forms in the cooling. Therefore, when the coarse TiNs are contained in the steel bar for hot forging at 0.3 to 4.0 mm$^2$, the coarse TiNs are also contained in the hot-forged product. Accordingly, the fracture splittability of the hot-forged product can be increased.

The cooled fracture splitting connecting rod is subjected to machining as necessary and thereafter reheated. In this case, the temperature for the reheating is preferably 550 to 650° C., and the duration of the reheating is preferably 5 to 60 minutes. Since the temperature for the reheating is low, Ti nitrides in the steel bar do not experience particular transformation in their forms. Through the above steps, a complete fracture splitting connecting rod is produced.

[Microstructure of Hot-Forged Product]

The produced hot-forged product (fracture splitting connecting rod) contains a microstructure that mainly contains bainite. Specifically, in the microstructure of the fracture splitting connecting rod, the area fraction of bainite is not less than 80%. When the area fraction of bainite is not 100%, the balance of a matrix structure is ferrite, or ferrite and pearlite. An upper limit of the area fraction of bainite is preferably 85%, more preferably 90%, still more preferably 95% or more, most preferably 100%. An example of the area fraction of bainite is 95 to 100%.

In a case of the hot-forged product mainly containing bainite, particularly, a hot-forged product containing not less than 80% of bainite, when its large end portion is broken off and divided into two parts (a cap and a rod), broken portions are prone to suffering plastic deformation, and the broken surface is likely to become a ductile fracture surface, which is prone to resulting in a decrease in the fracture splittability. However, the steel bar for hot forging according to the present embodiment has the above chemical composition, the chemical composition satisfies Formula (1), and in addition, the number density of coarse TiNs in the steel is 0.3 to 4.0/mm². Therefore, the broken surface of the hot-forged product is likely to become a brittle fracture surface, which can maintain an excellent fracture splittability. The sizes of TiNs are preferably made as large as possible; specifically, the sizes are preferably not less than 20 μm in terms of circle equivalent diameter.

The area fraction of the bainite in the microstructure can be measured by the following method. Ten samples are taken from arbitrary R/2 portions of the hot-forged product (center portions on line segments (radius) connecting the central axis of the steel bar and the outer peripheral surface of the steel bar). In each of the taken samples, a surface perpendicular to the central axis of the hot-forged product is determined as an observation surface. The observation surface is polished and thereafter etched with 3% nitric acid and alcohol (Nital etching reagent). The etched observation surface is observed under an optical microscope with 200× magnification, and photographic images of arbitrary five visual fields on the etched observation surface are created.

In each of the visual fields, phases containing ferrite, pearlite, bainite, and the like have their own different contrasts. Therefore, the phases are identified based on the respective contrasts. Of the identified phases, the area (μm²) of the bainite is determined in each visual field. A ratio of the areas of bainite in all of the visual fields to the total area of all of the visual fields (five visual fields×10) is defined as the area fraction (%) of bainite.

The above description is made about the producing method for the fracture splitting connecting rod as an example of the producing method of a hot-forged product. However, the application of the steel bar for hot forging according to the present embodiment is not limited to fracture splitting connecting rods. The steel bar for hot forging according to the present embodiment is widely applicable to a forged product usage.

The producing method for the steel bar for hot forging according to the present embodiment is not limited to the above producing method as long as the number density of coarse TiNs can be brought within the above range. That is, the steel bar for hot forging having the configuration according to the present embodiment may be produced by another producing method.

EXAMPLES

Molten steels having chemical compositions shown in Tables 1 and 2 were produced.

TABLE 1

| Test Number | Chemical Composition (in mass percent, balance being Fe and impurities) | | | | | | | | | | | fn1 |
|---|---|---|---|---|---|---|---|---|---|---|---|---|
| | C | Si | Mn | P | S | Cr | V | Ti | Al | N | Others | |
| 1 | 0.40 | 0.15 | 2.14 | 0.037 | 0.22 | 1.19 | 0.52 | 0.058 | 0.021 | 0.013 | — | 1.12 |
| 2 | 0.05 | 0.29 | 2.18 | 0.040 | 0.04 | 0.27 | 0.29 | 0.180 | 0.028 | 0.005 | — | 0.53 |
| 3 | 0.33 | 0.50 | 3.37 | 0.053 | 0.14 | 1.56 | 0.41 | 0.074 | 0.024 | 0.016 | — | 1.13 |
| 4 | 0.30 | 0.05 | 1.63 | 0.022 | 0.23 | 1.14 | 0.32 | 0.040 | 0.037 | 0.005 | — | 0.81 |
| 5 | 0.31 | 0.34 | 3.50 | 0.067 | 0.03 | 1.60 | 0.32 | 0.022 | 0.033 | 0.016 | — | 1.06 |
| 6 | 0.34 | 0.34 | 1.51 | 0.056 | 0.06 | 1.15 | 0.45 | 0.208 | 0.024 | 0.014 | — | 0.94 |
| 7 | 0.21 | 0.46 | 1.89 | 0.100 | 0.11 | 0.60 | 0.49 | 0.050 | 0.034 | 0.007 | — | 0.83 |
| 8 | 0.24 | 0.45 | 2.60 | 0.090 | 0.08 | 0.31 | 0.40 | 0.140 | 0.026 | 0.006 | — | 0.85 |
| 9 | 0.33 | 0.33 | 1.59 | 0.011 | 0.01 | 0.53 | 0.31 | 0.114 | 0.021 | 0.015 | — | 0.78 |
| 10 | 0.33 | 0.38 | 1.61 | 0.010 | 0.25 | 0.37 | 0.60 | 0.114 | 0.021 | 0.011 | — | 0.99 |
| 11 | 0.29 | 0.21 | 2.25 | 0.050 | 0.30 | 1.46 | 0.20 | 0.158 | 0.028 | 0.017 | — | 0.80 |
| 12 | 0.29 | 0.24 | 2.01 | 0.024 | 0.02 | 2.50 | 0.36 | 0.114 | 0.029 | 0.015 | — | 0.98 |
| 13 | 0.22 | 0.31 | 3.11 | 0.062 | 0.23 | 0.05 | 0.34 | 0.178 | 0.026 | 0.014 | — | 0.82 |
| 14 | 0.34 | 0.27 | 2.18 | 0.043 | 0.17 | 1.47 | 0.75 | 0.214 | 0.021 | 0.015 | — | 1.26 |
| 15 | 0.31 | 0.41 | 2.60 | 0.048 | 0.26 | 1.59 | 0.70 | 0.064 | 0.022 | 0.008 | — | 1.25 |
| 16 | 0.36 | 0.16 | 3.13 | 0.036 | 0.26 | 1.15 | 0.11 | 0.036 | 0.039 | 0.011 | — | 0.88 |
| 17 | 0.33 | 0.37 | 1.93 | 0.034 | 0.23 | 0.90 | 0.10 | 0.094 | 0.022 | 0.008 | — | 0.69 |
| 18 | 0.27 | 0.11 | 2.54 | 0.035 | 0.17 | 0.37 | 0.33 | 0.250 | 0.025 | 0.011 | — | 0.83 |
| 19 | 0.27 | 0.27 | 2.08 | 0.024 | 0.09 | 1.38 | 0.35 | 0.240 | 0.037 | 0.014 | — | 0.87 |
| 20 | 0.24 | 0.45 | 1.63 | 0.037 | 0.23 | 1.37 | 0.54 | 0.005 | 0.020 | 0.017 | — | 0.93 |
| 21 | 0.33 | 0.12 | 2.82 | 0.068 | 0.05 | 0.82 | 0.57 | 0.126 | 0.060 | 0.007 | — | 1.13 |
| 22 | 0.26 | 0.32 | 3.15 | 0.053 | 0.17 | 0.67 | 0.56 | 0.184 | 0.005 | 0.010 | — | 1.08 |
| 23 | 0.30 | 0.15 | 2.61 | 0.021 | 0.18 | 0.53 | 0.39 | 0.190 | 0.027 | 0.020 | — | 0.92 |
| 24 | 0.27 | 0.15 | 2.56 | 0.067 | 0.03 | 1.18 | 0.39 | 0.172 | 0.031 | 0.019 | — | 0.94 |
| 25 | 0.24 | 0.12 | 1.57 | 0.051 | 0.14 | 0.16 | 0.45 | 0.184 | 0.040 | 0.003 | — | 0.76 |
| 26 | 0.26 | 0.36 | 2.77 | 0.063 | 0.07 | 0.38 | 0.45 | 0.098 | 0.037 | 0.002 | — | 0.93 |
| 27 | 0.39 | 0.29 | 3.44 | 0.050 | 0.22 | 0.77 | 0.74 | 0.204 | 0.032 | 0.010 | Mo: 0.59 | 1.50 |
| 28 | 0.38 | 0.28 | 3.39 | 0.035 | 0.01 | 1.30 | 0.66 | 0.158 | 0.029 | 0.013 | Mo: 0.69 | 1.49 |
| 29 | 0.22 | 0.10 | 1.56 | 0.039 | 0.21 | 0.15 | 0.11 | 0.214 | 0.040 | 0.013 | — | 0.49 |

TABLE 2

| Test Number | Chemical Composition (in mass percent, balance being Fe and impurities) | | | | | | | | | | | fn1 |
|---|---|---|---|---|---|---|---|---|---|---|---|---|
| | C | Si | Mn | P | S | Cr | V | Ti | Al | N | Others | |
| 30 | 0.20 | 0.27 | 1.52 | 0.046 | 0.07 | 0.12 | 0.14 | 0.102 | 0.039 | 0.009 | — | 0.48 |
| 31 | 0.30 | 0.18 | 2.67 | 0.029 | 0.24 | 0.51 | 0.18 | 0.164 | 0.033 | 0.013 | — | 0.77 |
| 32 | 0.33 | 0.22 | 1.95 | 0.029 | 0.14 | 0.83 | 0.53 | 0.198 | 0.038 | 0.012 | — | 1.01 |
| 33 | 0.21 | 0.42 | 2.96 | 0.042 | 0.18 | 0.40 | 0.16 | 0.164 | 0.029 | 0.006 | — | 0.69 |
| 34 | 0.33 | 0.42 | 2.33 | 0.051 | 0.17 | 1.41 | 0.53 | 0.152 | 0.036 | 0.006 | — | 1.10 |

TABLE 2-continued

| Test Number | \multicolumn{10}{c}{Chemical Composition (in mass percent, balance being Fe and impurities)} | fn1 |
| --- | --- | --- | --- | --- | --- | --- | --- | --- | --- | --- | --- | --- |
| | C | Si | Mn | P | S | Cr | V | Ti | Al | N | Others | |
| 35 | 0.37 | 0.18 | 2.37 | 0.052 | 0.08 | 1.47 | 0.65 | 0.204 | 0.029 | 0.015 | — | 1.24 |
| 36 | 0.37 | 0.26 | 2.48 | 0.055 | 0.20 | 0.48 | 0.65 | 0.166 | 0.029 | 0.006 | — | 1.17 |
| 37 | 0.33 | 0.24 | 2.10 | 0.031 | 0.14 | 1.46 | 0.51 | 0.072 | 0.036 | 0.014 | Cu: 0.59 | 1.06 |
| 38 | 0.29 | 0.13 | 2.98 | 0.029 | 0.18 | 1.38 | 0.26 | 0.124 | 0.026 | 0.008 | Ni: 0.60 | 0.92 |
| 39 | 0.26 | 0.16 | 2.48 | 0.060 | 0.09 | 1.37 | 0.55 | 0.150 | 0.034 | 0.015 | Mo: 0.69 | 1.19 |
| 40 | 0.30 | 0.18 | 3.13 | 0.060 | 0.20 | 0.85 | 0.19 | 0.090 | 0.029 | 0.005 | Nb: 0.100 | 0.85 |
| 41 | 0.37 | 0.10 | 1.61 | 0.035 | 0.22 | 1.31 | 0.37 | 0.050 | 0.036 | 0.013 | Pb: 0.29 | 0.93 |
| 42 | 0.24 | 0.31 | 3.43 | 0.026 | 0.00 | 1.17 | 0.53 | 0.172 | 0.031 | 0.013 | Te: 0.2500 | 1.11 |
| 43 | 0.27 | 0.09 | 2.23 | 0.060 | 0.04 | 1.32 | 0.38 | 0.128 | 0.028 | 0.013 | Ca: 0.0100 | 0.91 |
| 44 | 0.34 | 0.37 | 2.41 | 0.056 | 0.17 | 1.02 | 0.51 | 0.124 | 0.029 | 0.006 | Bi: 0.3900 | 1.07 |
| 45 | 0.29 | 0.19 | 2.06 | 0.035 | 0.13 | 0.92 | 0.45 | 0.026 | 0.033 | 0.013 | — | 0.93 |
| 46 | 0.24 | 0.42 | 3.26 | 0.052 | 0.09 | 1.19 | 0.45 | 0.154 | 0.020 | 0.015 | — | 1.03 |
| 47 | 0.37 | 0.40 | 1.97 | 0.064 | 0.10 | 1.46 | 0.30 | 0.158 | 0.037 | 0.012 | — | 0.93 |
| 48 | 0.29 | 0.43 | 3.15 | 0.065 | 0.12 | 1.03 | 0.59 | 0.094 | 0.030 | 0.009 | — | 1.16 |
| 49 | 0.26 | 0.42 | 2.84 | 0.039 | 0.03 | 1.15 | 0.76 | 0.074 | 0.024 | 0.006 | — | 1.23 |
| 50 | 0.24 | 0.20 | 2.80 | 0.031 | 0.30 | 0.92 | 0.09 | 0.182 | 0.028 | 0.006 | — | 0.69 |
| 51 | 0.31 | 0.34 | 1.72 | 0.049 | 0.07 | 0.19 | 0.42 | 0.260 | 0.023 | 0.010 | — | 0.83 |
| 52 | 0.27 | 0.38 | 1.99 | 0.022 | 0.25 | 1.18 | 0.52 | 0.004 | 0.038 | 0.007 | — | 0.97 |
| 53 | 0.37 | 0.40 | 3.22 | 0.032 | 0.06 | 1.18 | 0.56 | 0.122 | 0.037 | 0.021 | — | 1.24 |
| 54 | 0.34 | 0.18 | 2.63 | 0.064 | 0.23 | 0.53 | 0.48 | 0.164 | 0.026 | 0.001 | — | 1.03 |
| 55 | 0.39 | 0.22 | 3.39 | 0.033 | 0.17 | 1.03 | 0.70 | 0.166 | 0.036 | 0.017 | Mo: 0.68 | 1.51 |
| 56 | 0.21 | 0.40 | 1.52 | 0.045 | 0.05 | 0.12 | 0.11 | 0.040 | 0.030 | 0.013 | — | 0.47 |
| 57 | 0.13 | 0.25 | 1.50 | 0.015 | 0.02 | 0.40 | 0.32 | 0.070 | 0.010 | 0.001 | Cu: 0.15, Ni: 0.10, Mo: 0.18 | 0.60 |

Referring to Tables 1 and 2, the chemical compositions of test numbers 1 to 48 were appropriate and satisfied Formula (1). Meanwhile, as to test numbers 49 to 57, the chemical composition had an inappropriate content, or Formula (1) was not satisfied.

For each test number, a molten steel was produced in the 70 ton converter. From the molten steel, a cast piece (bloom) was produced by the continuous casting process by using a continuous casting machine. The bloom had a cross section of 300 mm×400 mm. For each test number, the temperature (° C.) of the molten steel in a tundish was measured, and a degree of superheating ΔT (° C.), the difference between the temperature of the molten steel and a TLL (liquidus temperature), was determined. In addition, for each test number, casting was performed at a casting speed Vc (m/min) shown in Tables 3 and 4. For every test number, the specific water volume was not more than 5 L/kg.

TABLE 3

| Test Number | fn1 | ΔT (° C.) | Vc (m/min) | Number Density of Coarse TiNs (/mm$^2$) | Area Ratio of Bainite (%) | Hot Workability | Yield Strength | Fatigue Strength | Machinability | Fracture Splittability |
| --- | --- | --- | --- | --- | --- | --- | --- | --- | --- | --- |
| 1 | 1.12 | 43 | 0.7 | 2.4 | 83 | A | A | A | C | A |
| 2 | 0.53 | 34 | 0.6 | 2.1 | 84 | A | A | C | A | A |
| 3 | 1.13 | 42 | 0.4 | 0.8 | 83 | C | A | A | A | A |
| 4 | 0.81 | 35 | 0.4 | 3.6 | 86 | A | A | C | A | A |
| 5 | 1.06 | 41 | 0.4 | 2.4 | 83 | C | A | A | A | A |
| 6 | 0.94 | 45 | 0.4 | 2.9 | 88 | A | A | C | A | A |
| 7 | 0.83 | 32 | 0.4 | 1.0 | 82 | C | A | A | A | A |
| 8 | 0.85 | 43 | 0.8 | 2.7 | 81 | B | A | A | A | A |
| 9 | 0.78 | 40 | 0.3 | 3.2 | 89 | A | A | A | A | B |
| 10 | 0.99 | 49 | 0.3 | 0.7 | 95 | A | A | A | A | C |
| 11 | 0.80 | 32 | 0.3 | 3.3 | 88 | C | A | A | A | A |
| 12 | 0.98 | 37 | 0.7 | 2.2 | 90 | A | A | A | C | A |
| 13 | 0.82 | 33 | 0.2 | 1.6 | 92 | A | A | C | A | A |
| 14 | 1.26 | 49 | 0.7 | 0.7 | 92 | A | A | A | C | A |
| 15 | 1.25 | 35 | 0.3 | 3.3 | 89 | A | A | A | B | A |
| 16 | 0.88 | 49 | 0.7 | 3.1 | 99 | A | A | B | A | B |
| 17 | 0.69 | 30 | 0.7 | 2.6 | 99 | A | A | C | A | C |
| 18 | 0.83 | 49 | 0.5 | 2.5 | 98 | C | A | A | A | A |
| 19 | 0.87 | 32 | 0.6 | 2.2 | 99 | B | A | A | A | A |
| 20 | 0.93 | 39 | 0.4 | 0.9 | 85 | A | A | C | A | C |
| 21 | 1.13 | 46 | 0.4 | 1.7 | 92 | C | A | A | A | A |
| 22 | 1.08 | 49 | 0.3 | 3.2 | 90 | A | A | A | A | A |
| 23 | 0.92 | 49 | 0.4 | 2.5 | 81 | C | A | A | A | A |
| 24 | 0.94 | 32 | 0.4 | 3.6 | 81 | B | A | A | A | A |
| 25 | 0.76 | 34 | 0.4 | 3.5 | 87 | A | A | A | A | B |
| 26 | 0.93 | 34 | 0.4 | 1.8 | 90 | A | A | A | A | C |
| 27 | 1.50 | 46 | 0.4 | 2.6 | 80 | A | A | A | C | A |
| 28 | 1.49 | 36 | 0.2 | 1.7 | 92 | A | A | A | B | A |
| 29 | 0.49 | 31 | 0.7 | 2.7 | 96 | A | B | A | A | A |

TABLE 4

| Test Number | fn1 | ΔT (° C.) | Vc (m/min) | Number Density of Coarse TiNs (/mm²) | Area Ratio of Bainite (%) | Hot Workability | Yield Strength | Fatigue Strength | Machinability | Fracture Splittability |
|---|---|---|---|---|---|---|---|---|---|---|
| 30 | 0.48 | 37 | 0.6 | 2.6 | 81 | A | C | A | A | A |
| 31 | 0.77 | 37 | 0.3 | 4.0 | 87 | C | A | A | A | A |
| 32 | 1.01 | 42 | 0.8 | 3.9 | 80 | B | A | A | A | A |
| 33 | 0.69 | 33 | 0.6 | 3.8 | 97 | A | A | A | A | A |
| 34 | 1.10 | 50 | 0.4 | 0.5 | 91 | A | A | A | A | A |
| 35 | 1.24 | 44 | 0.7 | 0.4 | 99 | A | A | A | A | B |
| 36 | 1.17 | 44 | 0.4 | 0.3 | 87 | A | A | A | A | C |
| 37 | 1.06 | 31 | 0.2 | 1.9 | 89 | A | A | S | A | A |
| 38 | 0.92 | 38 | 0.3 | 0.7 | 83 | A | A | S | A | A |
| 39 | 1.19 | 46 | 0.5 | 1.6 | 86 | A | A | S | A | A |
| 40 | 0.85 | 42 | 0.2 | 3.5 | 80 | A | A | S | A | A |
| 41 | 0.93 | 39 | 0.6 | 0.6 | 84 | A | A | A | S | A |
| 42 | 1.11 | 42 | 0.7 | 3.0 | 88 | A | A | A | S | A |
| 43 | 0.91 | 34 | 0.6 | 3.4 | 95 | A | A | A | S | A |
| 44 | 1.07 | 36 | 0.7 | 1.2 | 93 | A | A | A | S | A |
| 45 | 0.93 | 53 | 0.5 | 4.1 | 89 | NA | A | A | A | A |
| 46 | 1.03 | 23 | 0.7 | 0.2 | 98 | A | A | A | A | NA |
| 47 | 0.93 | 46 | 0.1 | 4.5 | 86 | NA | A | A | A | A |
| 48 | 1.16 | 38 | 0.9 | 0.1 | 100 | A | A | A | A | NA |
| 49 | 1.23 | 46 | 0.8 | 1.3 | 87 | A | A | A | NA | A |
| 50 | 0.69 | 37 | 0.5 | 1.8 | 85 | A | A | NA | A | C |
| 51 | 0.83 | 33 | 0.8 | 2.4 | 89 | NA | A | A | A | A |
| 52 | 0.97 | 48 | 0.3 | 0.0 | 97 | A | A | NA | A | NA |
| 53 | 1.24 | 45 | 0.7 | 0.5 | 85 | NA | A | A | A | A |
| 54 | 1.03 | 31 | 0.4 | 0.1 | 86 | A | A | A | A | NA |
| 55 | 1.51 | 48 | 0.2 | 1.5 | 87 | A | A | A | NA | A |
| 56 | 0.47 | 45 | 0.5 | 0.7 | 97 | A | NA | A | A | A |
| 57 | 0.60 | 20 | 0.5 | 0.0 | 100 | A | A | NA | A | NA |

The produced cast piece was subjected to the hot rolling to produce a billet. The billet was heated at 1150° C. for 35 minutes and thereafter subjected to the finish rolling with a finish rolling mill, to produce a steel bar having a diameter of 40 mm (steel bar for hot forging).

[Producing Hot-Forged Mock Product]

The steel bar was cut in a direction perpendicular to its longitudinal direction, and a sample material having a diameter of 40 mm and a length of 100 mm was taken. The sample material was heated and held at 1250° C. for five minutes. Immediately after the heating, the sample material was subjected to hot pressing in an axis direction at 90%, formed into a disk shape, and produce a hot-forged mock product (called a hot-forged mock product). The formed hot-forged mock product was allowed to be cooled in the atmosphere. After the allowing cooling, the specimen was reheated and held at 600° C. for 30 minutes. All of the hot-forged mock product of each test number produced by the above method had showed an absorbed energy E (2 mmV) in the Charpy impact test defined in JIS Z 2242(2005) of less than about 20 J/cm², and showed a fracture toughness value $K_Q$ defined in ASTM E399-06 of less than 40 MPa√m.

[Evaluation Test]

Using the sample material and the hot-forged mock product, the following evaluation test was conducted.

[Measuring Number Density of Coarse TiNs]

A sample was taken from an R/2 portion of sample material of each test number. In a surface of the sample, a surface equivalent to a cross section including an axis direction of the sample material of each test number (longitudinal cross-section) was determined as an observation surface. Not being etched, the observation surface was observed under an optical microscope with 200× magnification as it was, and photographic images were created in arbitrary 100 visual fields. The total area of the 100 visual fields was about 11.9 mm². By the above method, TiNs were specified, and the number density (/mm²) of coarse TiNs was determined. The determined number densities of coarse TiNs (/mm²) are shown in Table 3 and Table 4.

[Evaluation of Hot Workability]

For each test number, 50 hot-forged mock products were produced. Surfaces of the produced hot-forged mock products of each test number were each visually checked for the presence of a crack. A case in which the number of cracks occurring was zero for the fifty hot-forged mock products was determined as an evaluation "A", a case in which the number was one was determined as an evaluation "B", a case in which the number was two to three was determined as an evaluation "C", and a case in which the number was four or more was determined as an evaluation "NA". In cases of the evaluations "A" to "C", it was determined that excellent hot workabilities were obtained, and in a case of the evaluation "NA", it was determined that an excellent hot workability was not obtained. Results of the evaluation are shown in Table 3 and Table 4.

[Microstructure Observation]

Using the hot-forged mock product of each test number, a microstructure observation test was conducted. Specifically, in a longitudinal cross-section of the hot-forged mock product of each test number, a sample including an R/2 portion was taken. A surface perpendicular to the central axis of the steel bar for hot forging was determined as an observation surface. The observation surface was polished and thereafter etched with 3% nitric acid and alcohol (Nital etching reagent). The etched observation surface was observed under an optical microscope with 200× magnification, and the area fraction (%) of bainite was determined by the above method. Determined area fractions of bainite (%) are shown in Table 3 and Table 4.

[Evaluation of Yield Strength]

From an R/2 portion of the hot-forged mock product of each test number, two JIS 14A specimens defined in JIS Z 2241(2011) were taken. Using the taken specimens, a tension test was conducted in the atmosphere at a room temperature (25° C.), determining a yield strength (MPa) as an average over the two specimens.

A case in which the yield strength (MPa) was 1200 to 1001 MPa was determined as an evaluation "A", a case in which the yield strength (MPa) was 1000 to 801 MPa was determined as an evaluation "B", and a case in which the yield strength (MPa) was 800 to 601 MPa was determined as an evaluation "C". A case in which the yield strength was not more than 600 MPa was determined as an evaluation "NA".

In cases of the evaluations "A" to "C", it was determined that high yield strengths were obtained. In a case of the evaluation "NA", it was determined that the yield strength was low. Results of the evaluation are shown in Tables 3 and 4.

[Evaluation of Fatigue Strength]

From an R/2 portion of the hot-forged mock product of each test number, a JIS 14A specimen defined in JIS Z 2241(2011) was taken. Using the taken specimen, an alternating fatigue test with a sine wave having a phase 0 (MPa) was conducted in the atmosphere at a room temperature (25° C.). A maximum stress below which the specimen was not broken off even when the number of repetition reached $10^7$ was determined as the fatigue strength (MPa). The frequency used in the test was set at 15 Hz.

A case in which the fatigue strength was 600 to 551 MPa was determined as an evaluation "S", a case in which the fatigue strength was 550 to 501 MPa was determined as an evaluation "A", a case in which the fatigue strength was 500 to 451 MPa was determined as an evaluation "B", and a case in which the fatigue strength was 450 to 401 MPa was determined as an evaluation "C". A case in which the fatigue strength was not more than 400 MPa was determined as an evaluation "NA".

In cases of the evaluations "S", and "A" to "C", it was determined that high fatigue strengths were obtained. In a case of the evaluation "NA", it was determined that the fatigue strength was low. Results of the evaluation are shown in Tables 3 and 4.

[Evaluation of Machinability]

For each test number, five hot-forged mock products were prepared. The prepared five hot-forged mock products were subjected to drilling at arbitrary locations, and when the drilling was performed for 50 holes in total, an amount of wear of a tool used in the drilling was measured. A diameter of a drill was set at 10 mm, and a rotational speed of a spindle of the drill was set at 1000 rev/min.

A case in which the amount of wear of the tool was 0 to 20 μm was determined as an evaluation "S", a case in which the amount of wear of the tool was 21 to 40 μm was determined as an evaluation "A", a case in which the amount of wear of the tool was 41 to 60 μm was determined as an evaluation "B", and a case in which the amount of wear of the tool was 61 μm to 80 μm was determined as an evaluation "C". A case in which the amount of wear of the tool was not less than 81 μm was determined as an evaluation "NA" In cases of the evaluations "S" and "A" to "C", it was determined that excellent machinabilities were obtained. In a case of the evaluation "NA", it was determined that excellent machinability was not obtained. Results of the evaluation are shown in Tables 3 and 4.

[Evaluation of Fracture Splittability]

Figure 2A:
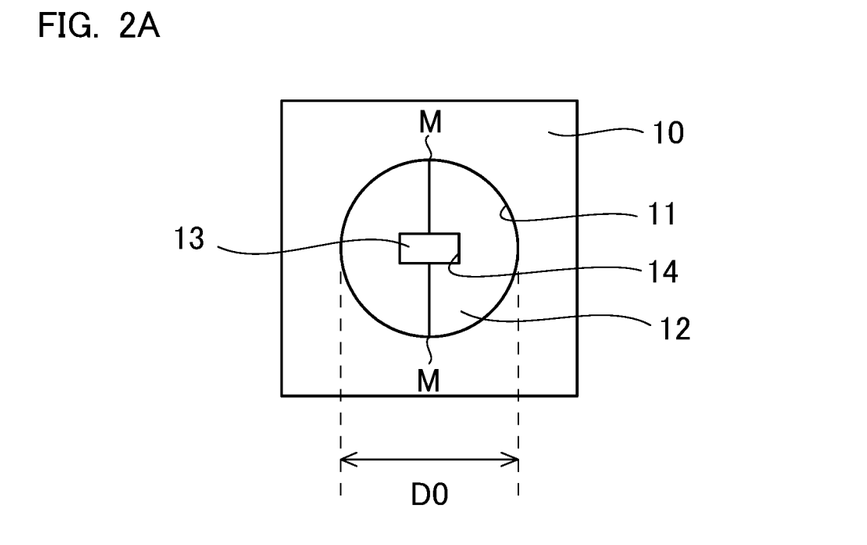
FIG. 2A is a plan view of a specimen used in an evaluation test for fracture splittability in Examples.

From the hot-forged mock product of each test number, a specimen 10 simulating a large end portion of a conrod illustrated in FIG. 2A was produced by machining. The specimen 10 had a length of 80 mm for one side and a thickness of 10 mm. At the center of the specimen 10, a hole (through hole) 11 was formed. The hole 11 had a diameter of 60 mm and had a center coaxial with the center of the specimen 10. As illustrated in FIG. 2A, on a circumference of the hole 11, notches M in a V shape were machined at two locations corresponding to end points of a diameter. The notches M each had a depth of 1 mm and a front edge with R of 0.1 mm, and an opening angle of 60°.

Figure 2B:
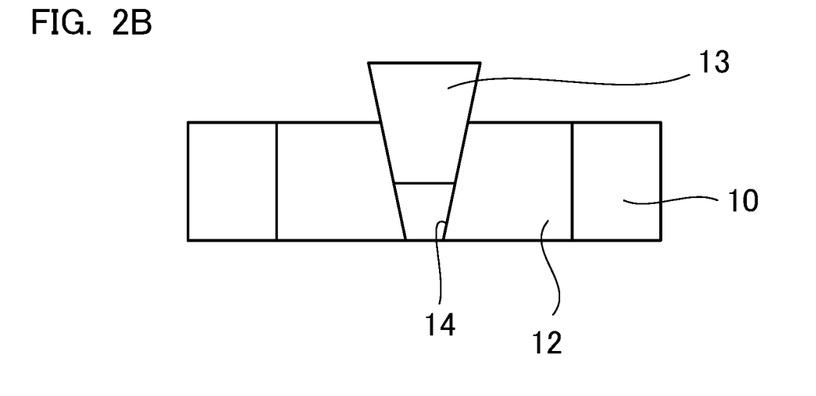
FIG. 2B is a cross-sectional view of the specimen illustrated in FIG. 2A.

A jig 12 was fitted into the hole 11. The jig 12 includes a pair of semicircle-plate-shaped members, which forms a disk having a diameter equivalent to the inner diameter of the hole 11. At the center of the jig 12, a hole 14 into which a wedge 13 was to be driven was formed (see FIG. 2B).

Figure 2C:
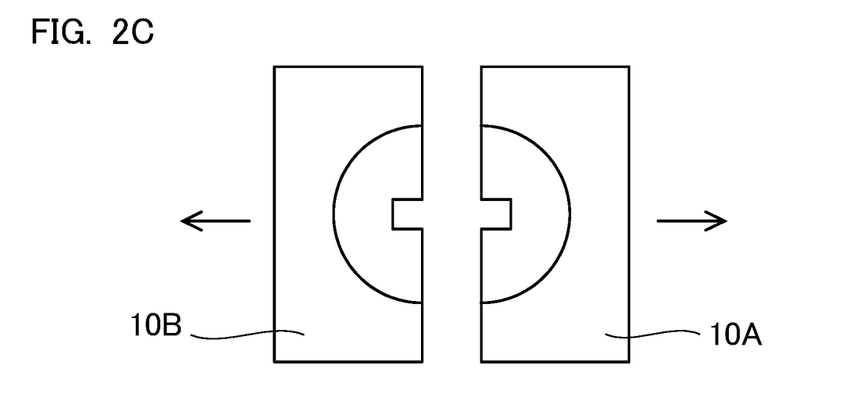
FIG. 2C is a plan view of the specimen, illustrating the specimen of FIG. 2A broken off to be separated.

After fitting the jig 12 into the hole 11, the wedge 13 was driven to break off and separate the specimen 10 into two members 10A and 10B at a room temperature (25° C.) (see FIG. 2C).

Figure 2D:
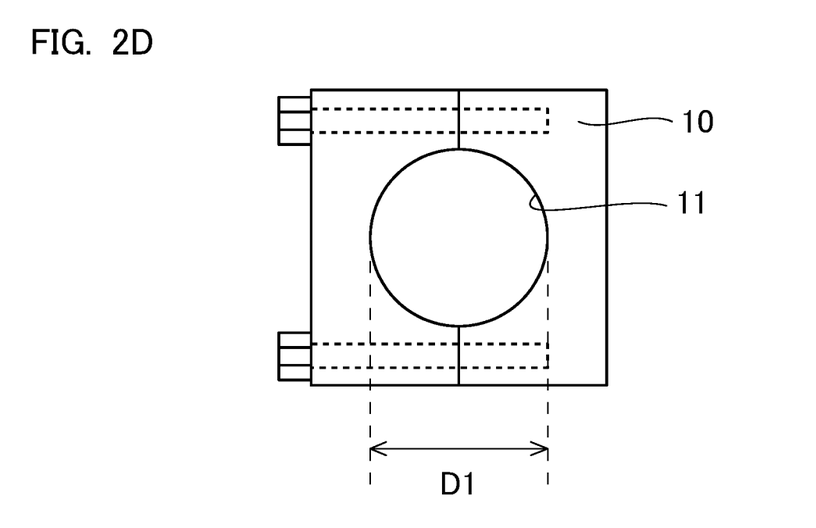
FIG. 2D is a plan view of the specimen, illustrating the specimen of FIG. 2C fastened to each other with bolts.

In each of the members 10A and 10B, bolt holes were machined in the vicinities of its both lateral sides, and the members 10A and 10B were fastened to each other with bolts illustrated in FIG. 2D. A diameter D0 (see FIG. 2A) of the hole 11 of the specimen 10 before being broken off to be separated and a diameter D1 (see FIG. 2D) of the hole 11 of the specimen 10 after being broken off to be separated and fastened with the bolts were measured, and the difference between the diameters was defined as an inner diameter deformation amount ΔD (=D1−D0, in μm).

A case in which the inner diameter deformation amount ΔD was 0 to 30 μm was determined as an evaluation "A", a case in which the inner diameter deformation amount ΔD was 31 to 50 μm was determined as an evaluation "B", and a case in which the inner diameter deformation amount ΔD was 51 to 80 was determined as an evaluation "C". In addition, a case in which the inner diameter deformation amount D was not less than 81 μm was determined as an evaluation "NA". In cases of the evaluations "A" to "C", it was determined that excellent fracture splittabilities were obtained. In a case of the evaluation "NA", it was determined that an excellent fracture splittability was not obtained. Results of the evaluation are shown in Table 3 and Table 4.

[Results of Evaluation]

Referring to Tables 3 and 4, as to the test numbers 1 to 44, their chemical compositions were appropriate, and their fn1 satisfied Formula (1). In addition, their degrees of superheating ΔT and the casting speeds Vc were also appropriate. Therefore, their number densities of coarse TiNs fell within a range of 0.3 to 4.0/mm². In addition, the area fractions of the bainite in the microstructures of their hot-forged products were 80 to 100%. As a result, their sample materials showed excellent hot workabilities. The hot-forged products showed high yield strengths, high fatigue strengths, excellent machinabilities, and excellent fracture splittabilities.

In contrast, as to Test Number 45, its degree of superheating ΔT was excessively high. Accordingly, its number density of coarse TiNs was excessively high. As a result, its sample material did not show an excellent hot workability.

As to Test Number 46, its degree of superheating ΔT was excessively low. Accordingly, its number density of coarse TiNs was excessively low. As a result, its hot-forged product did not show an excellent fracture splittability.

As to Test Number 47, its casting speed Vc was excessively low. Accordingly, its number density of coarse TiNs was excessively high. As a result, its sample material did not show an excellent hot workability.

As to Test Number 48, its casting speed Vc was excessively high. Accordingly, its number density of coarse TiNs was excessively low. As a result, its hot-forged product did not show an excellent fracture splittability.

As to Test Number 49, its content of V was excessively high. As a result, its hot-forged product did not show an excellent machinability.

As to Test Number 50, its content of V was excessively low. As a result, its hot-forged product did not show a high fatigue strength.

As to Test Number 51, its content of Ti was excessively high. As a result, its sample material did not show an excellent hot workability.

As to Test Number 52, its content of Ti was excessively low. Accordingly, its number density of coarse TiNs was excessively low. As a result, its hot-forged product did not show a high fatigue strength. In addition, its hot-forged product did not show an excellent fracture splittability.

As to Test Number 53, its content of N was excessively high. As a result, its sample material did not show an excellent hot workability.

As to Test Number 54, its content of N was excessively low. Accordingly, its number density of coarse TiNs was excessively low. As a result, its hot-forged product did not show an excellent fracture splittability.

As to Test Number 55, its fn1 was excessively high. As a result, its hot-forged product did not show an excellent machinability.

As to Test Number 56, fn1 was excessively low. As a result, its hot-forged product did not show a high yield strength.

As to Test Number 57, its content of Mn and its content of N were excessively low. In addition, as to Test Number 57, its degree of superheating ΔT was also excessively low. Accordingly, its number density of coarse TiNs was excessively low. As a result, its hot-forged product did not show a high fatigue strength. In addition, its hot-forged product did not show an excellent fracture splittability.

The embodiment according to the present invention has been described above. However, the aforementioned embodiment is merely an example for practicing the present invention. Therefore, the present invention is not limited to the aforementioned embodiment, and the aforementioned embodiment can be modified and implemented as appropriate without departing from the scope of the present invention.

The invention claimed is:

1. A steel bar for hot forging comprising
a chemical composition consisting of, in mass percent:
C: 0.05 to 0.40%;
Si: 0.05 to 0.50%;
Mn: 1.51 to 3.50%;
P: 0.010 to 0.100%;
S: 0.30% or less;
Cr: 0.05 to 2.50%;
V: 0.10 to 0.75%;
Ti: 0.005% to 0.250%;
Al: 0.005 to 0.060%;
N: 0.002 to 0.020%;
Cu: 0 to 0.60%;
Ni: 0 to 0.60%;
Mo: 0 to 0.70%;
Nb: 0 to 0.100%;
Pb: 0 to 0.30%;
Te: 0 to 0.3000%;
Ca: 0 to 0.0100%; and
Bi: 0 to 0.4000%, with the balance being Fe and impurities, and satisfying Formula (1), wherein
a number density of TiNs in the steel bar each having a circle equivalent diameter of not less than 20 μm is 0.3 to 4.0 /mm$^2$,
where the number density of TiNs is measured at the R/2 portion of the steel bar, a surface equivalent to a cross section including an axis direction of the steel bar is determined as an observation surface, and the observation surface is observed under an optical microscope with 200× magnification:

$$0.48 \leq C+0.11Mn+0.08Cr+0.75V+0.20Mo \leq 1.50 \quad (1)$$

where symbols of elements in Formula (1) are to be substituted by contents of corresponding elements (in mass percent).

2. The steel bar for hot forging according to claim 1, wherein
the chemical composition contains one or more types of elements selected from the group consisting of:
Cu: 0.01 to 0.60%;
Ni: 0.01 to 0.60%;
Mo: 0.01 to 0.70%; and
Nb: 0.005 to 0.100%.

3. The steel bar for hot forging according to claim 1, wherein
the chemical composition contains one or more types of elements selected from the group consisting of:
Pb: 0.01 to 0.30%;
Te: 0.0003 to 0.3000%;
Ca: 0.0003 to 0.0100%; and
Bi: 0.0003 to 0.4000%.

4. The steel bar for hot forging according to claim 2, wherein
the chemical composition contains one or more types of elements selected from the group consisting of:
Pb: 0.01 to 0.30%;
Te: 0.0003 to 0.3000%;
Ca: 0.0003 to 0.0100%; and
Bi: 0.0003 to 0.4000%.

* * * * *